No. 765,639. Patented July 19, 1904.

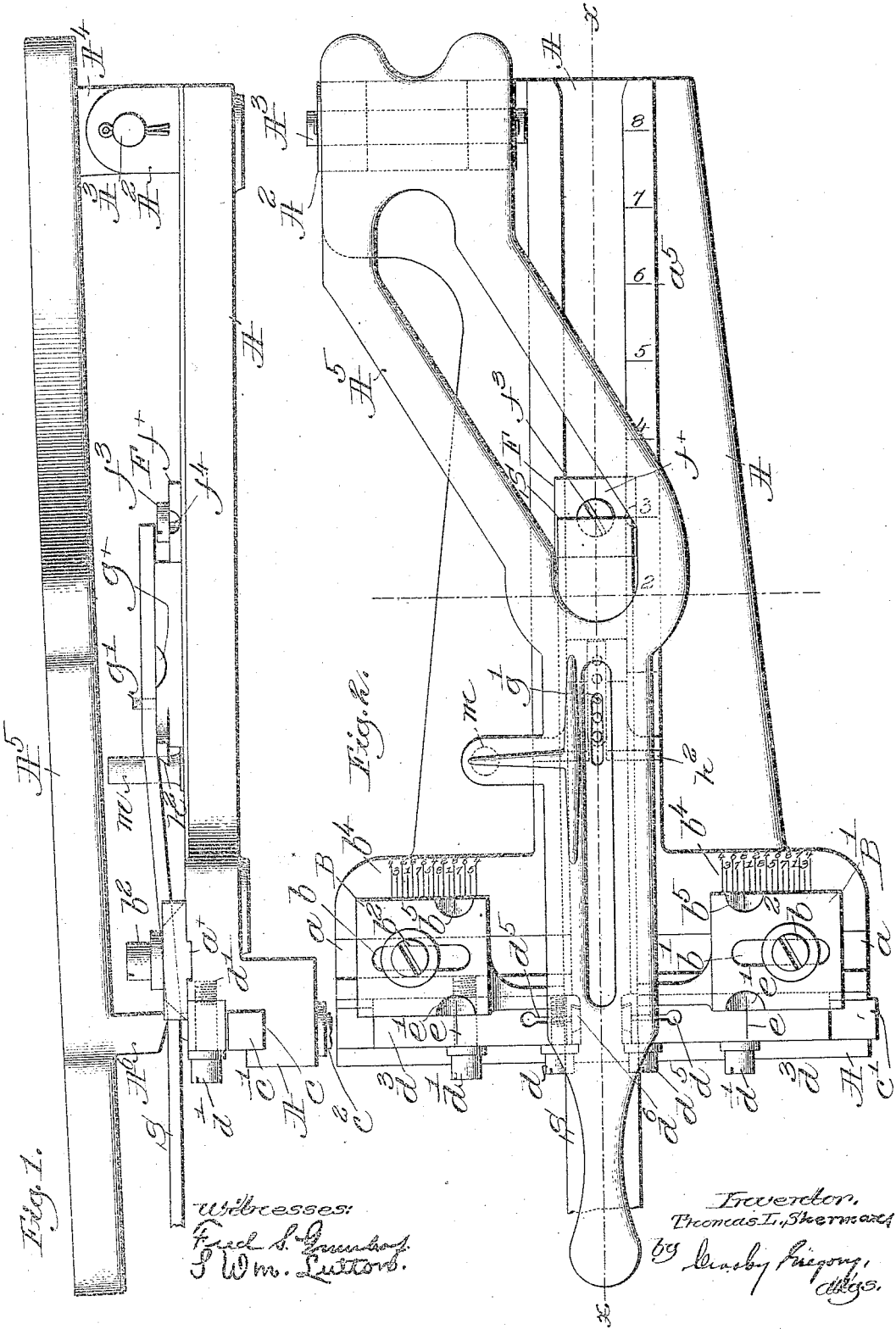

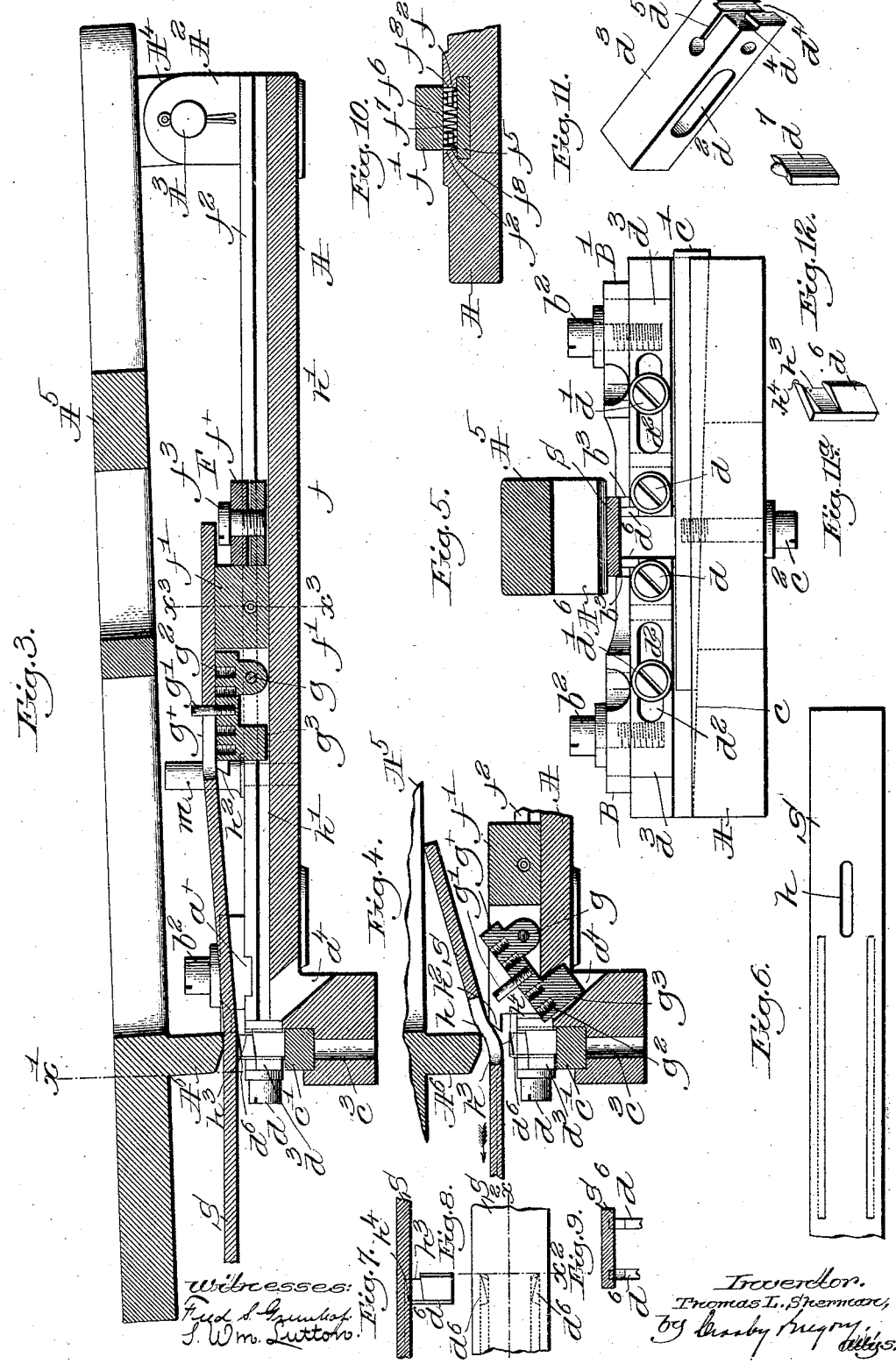

UNITED STATES PATENT OFFICE.

THOMAS L. SHERMAN, OF BOSTON, MASSACHUSETTS, ASSIGNOR TO THE STANDARD RIVET COMPANY, OF BOSTON, MASSACHUSETTS, A CORPORATION OF NEW HAMPSHIRE.

APPARATUS FOR GROOVING OR CHANNELING STRAPS.

SPECIFICATION forming part of Letters Patent No. 765,639, dated July 19, 1904.

Application filed February 6, 1904. Serial No. 192,280. (No model.)

*To all whom it may concern:*

Be it known that I, THOMAS L. SHERMAN, a citizen of the United States, residing at Boston, in the county of Suffolk and State of Massachusetts, have invented an Improvement in Apparatus for Grooving or Channeling Straps, of which the following description, in connection with the accompanying drawings, is a specification, like letters on the drawings representing like parts.

This invention has for its object the production of an apparatus for automatically grooving, indenting, or marking one side of a strap near one or both edges. This groove will usually be in the nature of a cut to receive stitches or other fastenings to unite one part of a strap with another part thereof, especially when securing a buckle to a strap.

Straps to which buckles are applied in harness-making vary in width, and the length of the groove or slit in which the fastenings of whatever form are embedded vary with the size of the buckle, and in the apparatus to be herein described I have made provision for varying the length of these grooves according to the width of the strap and the size of the buckle.

The apparatus has edge-gages adjustable with relation to a strap-holder carried by a carriage, so that the opposite edges of the strap to be grooved may be accurately positioned with relation to the tools which do the grooving, and these tools are made adjustable not only laterally or toward and from each other to provide for straps of varying width, but also vertically to enable them to cut the grooves of the desired depth.

The strap is connected with a strap-holder mounted on a carriage, and the starting-point of the carriage varies according to the size of the strap and the buckle, and the strap being engaged with the strap-holder clamping means, shown as a lever having a foot, is made to descend upon the strap and force the same downwardly upon the tools, while the latter act to groove the strap, and as soon as the groove has been formed or cut of the predetermined length, the grooves varying, it will be understood, in length according to the size of the strap and the buckle, the strap-holder is turned or moved to release the strap quickly therefrom, and at the same time as the carriage completes its movement the beveled end thereof meets the under side of and lifts the strap quickly from the tool, thus terminating the groove.

The particular features in which my invention consists will be hereinafter described, and pointed out in the claims at the end of this specification.

Figure 1 is a plan view of an apparatus embodying my invention. Fig. 2 is a side elevation thereof, a strap being shown as connected with the strap-holder. Fig. 3 is a longitudinal section with the carriage in its starting position and the clamp resting on the strap to cause the tools to act when the strap is pulled under the clamp. Fig. 4 is a partial section similar to Fig. 3, but with the strap-holder tipped to discharge the grooved strap, the carriage having lifted the strap from the tool. Fig. 5 is a section in the line $x'$, Fig. 3. Fig. 6 shows part of a strap grooved by my apparatus. Fig. 7 shows detached a tool made as a blade to cut a channel in the strap, the tool being shown as engaging the strap. Fig. 8 is a plan view of a part of a strap with two blades supposed to be cutting a channel in the under side of the strap near its opposite edges. Fig. 9 is a section in the line $x^2$, Fig. 8. Fig. 10 is a section in the line $x^3$, Fig. 3. Fig. 11 shows one of the tool-carriers detached. Fig. 11$^a$ shows tool $d^6$ detached. Fig. 12 shows a modified form of tool.

Referring to the drawings, A represents a bed or plate having a longitudinal guideway A' and ears $A^2$, that receive a pivot $A^3$, between which is entered a lug $A^4$, forming part of strap-clamping means, shown as a lever $A^5$, the end of which is extended forwardly and has a depending foot $A^6$. The bed or plate has two transverse grooves $a$, that receive projections $a^\times$ of edge-gages B B', slotted, as shown at $b\,b'$, for the reception of clamp-screws $b^2$, by which to confine said gages in their proper adjusted position, that the ends $b^3$ of said gages may occupy just exactly the desired position with relation to the longitudinal center of the strap to be grooved or channeled. The bed has two scales $b^4$, each coacting with one of the gages, each gage having an index-line $b^5$, that when brought in line with one of the lines of the gage will illustrate exactly the position for the gages and insure that the groove or channel be made exactly at the proper distance from either edge of the strap. The plate has another transverse groove $c$, that receives a tool-adjuster $c'$, shown as a wedge having a connected screw $c^2$, that is extended through a slot $c^3$ in the plate, the inclined under side of said wedge resting upon the inclined bottom (see Fig. 5) of said groove, so that by loosening said screw and moving said wedge the tools, to be described, being at such time held loosely and resting on said wedge, may be moved vertically, that the grooves or channels may be of exactly the same depth. The plate also has at each side of the guideway therein (see Figs. 1 and 2) threaded holes that receive clamp-screws $d'$, said clamp-screws entering each a slot $d^2$ in tool-carriers $d^3$, made as blocks, the upper sides of said tool-carriers being overlaid by the front ends of the gages B and B'.

Each tool-carrier has its front end provided with a vertical slot $d^4$ and a slot $d^5$ leading thereinto, (see Fig. 11,) to thus make yielding jaws, between which is located the tools or channel knives or cutters $d^6$ or $d^7$, of any desired or usual shape and adapted to form a groove or channel of the shape desired.

The free end of each carrier where slotted receives a clamp-screw $d$, that may be set up to clamp the tool or channel-knife in its operating position or turned out somewhat to leave the tool loose, that its lower end resting on the wedge $c'$ may be raised and put into its proper operative position by adjusting said wedge longitudinally, that depending upon the depth desired for the groove or channel.

To adjust tools or cutters one with relation to the other and with relation to the edge of the strap to be acted upon, that depending upon the width of the strap, it is only necessary to slacken the screws $d'$ and slide the carriers until the index-lines $e$ thereon, Fig. 2, coincide with the index-marks $e'$ on the gages.

The bed or plate has a diagonal hole $a^4$ and also an index $a^5$, provided with a series of numbers from "2" to "8" (see Fig. 2), representing what is called the "size-number" of the buckle to be applied to a strap.

In the guideway A', I locate a stop F, that determines the starting-point of the carriage $f'$, to be described, said stop being composed, as shown, of two plates $f$ $f^\times$, that embrace the overhanging edges $f^2$ at the opposite sides of said guideway, and by turning the screw $f^3$ the stop may be clamped in any adjusted position, the stop having an index-mark $f^4$ that may be put in line with either of the lines of the index $a^5$, according to the size of the buckle.

The carriage $f'$ has a foot $f^5$, (see Fig. 10,) that enters the spaces under the overhanging lips $f^2$ of the guideway, and said carriage is shown as provided with a hole $f^6$, in which is located a spring $f^7$ and blocks $f^8$, one block at each end of said spring, said spring acting normally to press said blocks against the edges of the guideway to produce sufficient friction to retain the carriage in place, except when said friction is overcome by pulling on the straps that are to be grooved or channeled.

The carriage has pivoted upon it at $g$ an ear of a strap-holder $g^\times$, having a stud $g'$ rising therefrom, which may be adjusted to occupy a position in either of the holes $g^2$ of said strap-holder, according to the size of the buckle to be applied to the grooved or channeled strap. This strap-holder has a depending heel $g^3$, that when the carriage is moved through pulling the strap in the direction of the arrow thereon, Figs. 3 and 4, said strap, having been provided with a hole $h$ to embrace the stud $g'$, will slide on the bottom $h'$ of the guideway A'; but as soon as the strap has been drawn to the left for the distance required to make a groove or channel of proper length for the particular size buckle to be put onto that strap said heel enters the hole $a^4$, and immediately the strap, due to the strain thereon, is discharged from the stud $g'$.

After the hole $h$ in the strap has been hooked over the stud $g'$ clamping means, shown as the lever $A^5$, having the foot $A^6$, is brought down upon the strap, as shown in Fig. 4, and is pressed down thereon by one hand or in any other desirable way, while the strap is drawn to the left viewing Fig. 4 by the operator or in any other manner.

The pressure of the foot $A^6$ of the clamping means on the upper side of the strap immediately above the tools $d^6$ causes the tools to properly engage the under side of the strap and groove or channel the same, the depth of the channel being gaged by the distance that the upper edges of the tools project above the carriers $d^3$.

As the carriage arrives at its position at the left, Fig. 6, the position in which the groove or channel should terminate, the strap-holder is tipped automatically to enable the strap to be discharged, and just as or before the strap is discharged the beveled end $h^2$ of the carriage meets the under side of the strap just in advance of the acting edge of the tool or channel-knife and lifts the strap quickly from the edge of the tool or channel-knife, so that the strap properly channeled for just the desired length is discharged from the machine.

The tool $d^6$ shown is represented as shaped to cut a channel—that is, it has a sharp edge $h^3$ and an overhanging lip $h^4$ to cut a channel. The shape of the channel formed by the tool $d^6$ is represented best in Fig. 9.

It will be obvious that with a tool having its upper end shaped as shown in Fig. 12 a V-shaped groove might be cut or formed in one side of the strap.

I believe that I am the first to provide an apparatus for grooving or channeling straps to which buckles are to be attached and the first to provide means whereby the length of the groove for receiving the stitches or fastenings to secure a buckle to a strap may be varied according to the requirements of the harness trade as to the number of stitches employed to connect one part of a strap with another part thereof where the strap is folded on itself to embrace the bar and tongue of a buckle, and consequently this invention is not to be limited to exactly the means shown for effecting this novel result, and I consider as within the scope of my invention and intend to cover any equivalent means capable of operating in substantially the manner herein described.

By the term "groove" I intend to include any depression or channel that may be formed in leather.

A stop $m$ is erected on the bed or plate A to prevent the foot $A^6$ of the clamp $A^5$ from contacting with the tops of the tools when a strap is absent from the apparatus.

Having described my invention, what I claim, and desire to secure by Letters Patent, is—

1. In a machine of the class described, a tool to groove a strap, a carriage having a strap-holder, and means to clamp or press a strap toward the tool while the relative positions of the tool and carriage are being changed, that the tool may groove the strap.

2. In a machine of the class described, a tool to groove a strap, a carriage having an adjustable strap-holder, and means to press a strap toward the tool while the relative positions of the tool and carriage are being changed that the tool may groove the strap.

3. In a machine of the class described, a tool to groove a strap, means to press a strap against the tool, a carriage having a pivoted strap-holder, means to change the relative positions of the tool and strap-holder while the tool is making its groove, and means to permit the strap-holder to tip and discharge the strap at the completion of the groove.

4. In a machine of the class described, a carriage provided with a strap-holder, a guideway for said carriage, a plurality of tools to groove a strap, and means to bear on the strap engaged by the strap-holder as the latter is being drawn over the tools.

5. In an apparatus of the class described, a carriage beveled at one end and provided with a strap-holder, a tool for grooving a strap, clamping means to bear on the strap engaged with the strap-holder as the strap is being drawn over the tool, the beveled end of said carriage acting to lift the strap from the tool preparatory to discharging the strap from the strap-holder.

6. In apparatus of the class described, a carriage having a strap-holder, a plurality of tools and tool-carriers, and means to adjust said carriers and tools toward and from each other.

7. In apparatus of the class described, a carriage having a strap-holder, a plurality of tools, carriers for said tools, and means to adjust said carriers and tools toward and from each other, and to adjust said tools in said carriers.

8. In apparatus of the class described, a carriage having a pivoted strap-holder, an edge-gage, and a tool to engage a strap at a distance from said edge-gage.

9. In apparatus of the class described, a carriage, a strap-holder pivoted thereon and having a heel, a bed having a depression to receive said heel at the end of the active movement of said carriage, a plurality of tools to engage one face of the strap, means to press the strap onto said tools as the relative positions of said carriage and tools are changed during the formation of a groove in the strap.

10. In apparatus of the class described, a carriage having a strap-holder, tools to groove the strap, and a stop adjustable as to its position to insure the starting-point of the carriage at a point depending upon the width of the strap and the size of the buckle to be applied thereto.

11. In apparatus of the class described, a carriage provided with a friction device, a bed having a guideway to receive said carriage, the friction device acting normally against the side walls of the guideway, and a pivoted strap-holder connected with said carriage and provided with a stud over which may be applied the buckle-hole made in a strap to be grooved, and means to groove the strap as the latter is drawn through the machine.

12. In apparatus of the class described, a bed having a guideway, a multipart block having an index and adapted to be clamped in said guideway at any desired point with relation to a size-gage representing the size of a buckle, and a carriage located in said guideway and adapted to be positioned for starting by said block, a strap-holder connected with said carriage, and means to groove a strap as the latter is drawn through the machine, the carriage moving with the strap away from said block.

13. In apparatus of the class described, a bed, a movable carriage having a connected strap-holder, a plurality of tools to contact with the under side of said strap, and gages adjustable toward and from the path of movement of said carriage.

14. In apparatus of the class described, a movable carriage having a connected strap-holder, gages adjustable toward and from each other at opposite sides the path of movement of said carriage, and tool-carriers each having a tool to enter the strap connected with the strap-holder as the strap and carriage are moved longitudinally.

15. In apparatus of the class described, a plurality of tool-carriers each having a tool, a wedge to contact with the lower ends of said tools when unclamped in the carriers, said wedge by its adjustment adjusting simultaneously the tools in the carriers, and means to clamp the tools in their adjusted position.

In testimony whereof I have signed my name to this specification in the presence of two subscribing witnesses.

THOS. L. SHERMAN.

Witnesses:
GEO. W. GREGORY,
E. A. BARBER.